(12) United States Patent
Wyse et al.

(10) Patent No.: US 8,465,028 B2
(45) Date of Patent: Jun. 18, 2013

(54) HAND CART BRAKING SYSTEM

(76) Inventors: Gene Wyse, Wauseon, OH (US); Randy Wyse, Wauseon, OH (US)

( * ) Notice: Subject to any disclaimer, the term of this patent is extended or adjusted under 35 U.S.C. 154(b) by 0 days.

(21) Appl. No.: 13/194,280

(22) Filed: Jul. 29, 2011

(65) Prior Publication Data

US 2012/0025482 A1 Feb. 2, 2012

Related U.S. Application Data

(60) Provisional application No. 61/369,037, filed on Jul. 29, 2010.

(51) Int. Cl.
*B62B 5/04* (2006.01)
*B62B 1/00* (2006.01)

(52) U.S. Cl.
USPC .......................................... 280/47.24; 188/19

(58) Field of Classification Search
USPC ............. 280/651, 47.27, 47.24, 47.31, 87.04, 280/659, 63, 47.35, 47.34, 47.17, 47.19, 47.131, 43.24; 188/43, 18, 19, 58
See application file for complete search history.

(56) References Cited

U.S. PATENT DOCUMENTS

| | | | | |
|---|---|---|---|---|
| 3,968,974 | A * | 7/1976 | Wetzel | 280/47.27 |
| 4,793,623 | A * | 12/1988 | Talbot | 280/47.24 |
| 5,722,515 | A * | 3/1998 | Wyse | 188/22 |
| 7,032,718 | B1 * | 4/2006 | Lessard | 188/19 |
| 2002/0005619 | A1 * | 1/2002 | Cote | 280/47.31 |
| 2007/0096437 | A1 * | 5/2007 | Watson | 280/651 |

* cited by examiner

*Primary Examiner* — John Walters
*Assistant Examiner* — James Triggs
(74) *Attorney, Agent, or Firm* — Marshall & Melhorn, LLC

(57) ABSTRACT

An improved braking system for a hand cart is disclosed. The braking system has a split axle which is rotatably connected to the cart frame. Braking components are affixed to each of the split axle sections. An actuator is connected to a caliper system, which caliper system is used to push the braking components together to lock the split axle into a single axle for braking or controlling the cart.

9 Claims, 2 Drawing Sheets

HAND CART BRAKING SYSTEM

RELATED APPLICATIONS

This application claims the benefit of provisional application U.S. 61/369,037, filed Jul. 29, 2010. U.S. 61/369,037 was pending as of the filing date of the present application.

BACKGROUND OF THE INVENTION

1. Field of the Invention

The present invention relates to a hand operated braking system for a hand cart. More particularly, the present invention includes a hand cart braking system with a single clutch braking system.

2. Summary of Related Art

Hand carts are well known in the material handling industry for loading and unloading material from trucks and trailers. Hands carts are used not only at truck loading docks, but also at retail establishments and other delivery points. Hand carts are also essential devices for moving loads within warehouses and production facilities. The primary construction of a hand cart includes two wheels on a single axle, two vertical frame members with cross frame members, a handle at the top of the frame, and a load engaging flange plate at the bottom of the frame. A typical braking system for a hand cart is a hand operated system positioned on the handle at the top of the frame.

A significant problem which occurs during use of a hand cart is controlling a loaded hand cart on an inclined surface. Inclined surfaces are encountered quite frequently in many hand cart applications, such as maneuvering hand carts up and down truck unloading ramps. The inability to control a loaded hand cart on an inclined surface frequently results in damage to the load being moved and injury to the person operating the hand cart.

When using a hand cart, the operator will frequently use only one hand to control the cart and the other hand is used to engage and steady the load being carried on the cart. Since the operator utilizes one hand on the load, the braking systems on hand carts are generally positioned at the handle and designed for one hand operation.

One of the problems with braking systems on hand carts is that the braking force should be applied uniformly to the two wheels. When the braking force is applied unevenly, the hand cart will not roll in a straight path and will swing to one side. When an operator is applying the brake while rolling a loaded hand cart down a loading ramp, uniform braking to facilitate straight path operation is essential.

Another requirement for hand cart operation is maneuverability. Since hand carts must be operable on a non-linear path when moving a load, it is essential that the braking system not adversely effect the maneuverability of the hand cart. Independent operation of the wheels is required to permit the hand cart to turn corners in a controlled manner.

A majority of hand carts do not have any braking capabilities and the person using the hand cart must use their own strength to stop and/or control a cart on an inclined surface. Several braking systems for hand carts are disclosed in the prior art. The hand carts of the prior art typically include independent wheels and a fixed axle which are mounted on a bracket or other mounting means on the lower corners of the frame. A separate braking mechanism is required for each of the wheels. One of the problems with the prior art systems has been achieving uniform braking force at the two wheels.

In the prior art, Honeyman (U.S. Pat. No. 3,276,550) discloses an U-shaped brake rod mounted between the two wheels. Projecting ends are positioned above the wheels to form a braking means. When the handle is pulled, the projecting ends are positioned in front of the wheels such that a braking force is applied to limit the rotation of the wheels. The forward movement of the wheels tends to cause greater engagement between the wheels and the projecting ends which creates a self actuating feature.

In attempting to improve the maneuverability of the hand cart during braking, Malloy (U.S. Pat. No. 3,486,587) discloses the benefits of having independent operation of the brakes with a single operating handle. A special linkage is attached to the brake shoes of the wheels to provide independent braking.

Wetzel (U.S. Pat. No. 3,368,974) discloses wheels mounted by separate bearings mounted on a fixed axle to provide for independent rotation. A hydraulic system is used to actuate a caliper-type disc brake system mounted at each of the wheels. Equal braking force is applied to each of the wheels. Boyd (U.S. Pat. No. 4,142,732) teaches a disc braking system to brake the main axle shown in the specialized hand cart. The wheels are independently mounted on star-shaped plates, and the plates rotate when the cart is used on stairs. The hand brake system locks the main axle to prevent the plates from rotating.

Laird (U.S. Pat. No. 4,819,767) discloses a braking system which can be used on both two-wheel and four-wheel hand carts. Brake discs are mounted in the frame and are selectively extended from the frame to engage the sidewalls of the wheels to prevent rotation of the wheels.

A hand cart having a brake drum mounted about the hub of the wheels is disclosed in Hedrick (U.S. Pat. No. 5,390,943). The wheels operate independently. The brakes are operated by a single handle with two separate brake actuating cables to two independent brakes. The stopping force to each wheel is equalized by a brake adjusting screw on each brake.

Hlebakos (U.S. Pat. No. 5,433,464) shows a braking system having wheels with a braking shoe and backing plate assembly. A pulley system and cam followers are used to provide equal braking pressure to each of the wheels. Such a braking system is intended for retrofitting on existing hand carts.

The braking system disclosed in Grieg (U.S. Pat. No. 5,524,731) teaches a brake bar mounted on the cart and extending between the two wheels of the cart. Brake pads are mounted on the brake bar which engage the wheels. A step plate is attached to the bar to permit the operator to tilt the hand cart into an operating position.

Wyse (U.S. Pat. No. 5,722,515) discloses a hand cart braking system having a rotatable split axle mounted laterally between the wheels of the hand cart. The axle is split in the middle of the axle to form two distinct segments. Each axle segment rotates with its respective wheel, and the axle segment and wheel on one side of the cart rotate independently of the other axle segment and wheel combination. A brake is mounted on the axle at the junction of the two axle segments. An actuator handle is mounted on the cart at a convenient point for actuating the brake. When the brake is manually operated, the braking force is applied to both segments of the axle to smoothly stop the hand cart. The brake is preferably a disc brake or a drum brake, although other braking devices may also be used in the present system. The brake utilizes a double clutch system to engage and disengage the brake.

SUMMARY OF THE INVENTION

According to the present invention, there is provided an improved braking system utilizing a single clutch assembly.

Instead of utilizing a double clutch assembly, the system utilizes a split axle with a single clutch. The axle extends through bearing mounted on a bearing support at the bottom of the hand cart. Each axle segment rotates with its respective wheel, and the axle segment and wheel on one side of the cart rotate independently of the other axle segment and wheel combination.

A brake is mounted on the axle at the junction of the two axle segments. An actuator handle is mounted on the cart at a convenient point for actuating the brake. A rod or cable extends from the handle along the frame of the cart to the brake mounted on the axle. When the brake is manually operated, the braking force is applied to both segments of the clutch to smoothly stop the hand cart. The brake is preferably a disc brake or a drum brake, although other braking devices may also be used in the present system.

The split axle facilitates the independent rotation of the two axle pieces and the wheels which are fixed at opposite ends of the axle. The split axle provides superior operating performance when moving the cart around a turn or in other non-linear applications. Upon application of the brake however, the axle essentially forms a unitary piece. This allows for greater control of the cart when the brake is being applied.

The axle is mounted on a bearing support frame or bracket which is secured to the frame of the hand cart. The frame includes two bearings, one on each segment of the axle, to facilitate the rotation of the axle. The bearing support bracket includes a cross bar parallel to the split axle to provide a convenient foot pad for use in tilting the loaded hand truck.

The brake can be any type of brake to be mounted on the axle. Mounting the brake at the junction of the axle segments permits the use of a single actuator for braking both axle segments. Drum brake and a disc brake are the two preferred configurations for the system. Each axle segment is provide with a drum. The friction bands for engaging the drums are mounted about the drums between the brackets. The friction bands can be activated by a single actuator. For a disc brake, a disc is welded to each of the axle segments and the friction pads are mounted about the discs.

With the single clutch system, a brake can be provided that has a brake pad on each side, or a brake pad on one side and a rotor on the other. Any standard braking material could be incorporated in embodiments of the present invention.

An object of the present invention is to provide a hand cart braking system that provides an improved braking system that is cost effective. Many of the braking systems are very complex such that the costs would be unreasonable and too expensive to gain wide spread acceptance in the industry. The present invention is a mechanically simplified system that performs at a high level, yet is mechanically simpler, and thus more cost effective than known braking systems. The system also provides an operating performance needed in hand truck applications on an inclined surface.

An object of the present invention is to provide a hand cart braking system which can be operated with one hand, yet still achieve even braking force at both of the wheels. In addition, the wheels of the cart must operate independently to ensure maneuverability to handle turns and curves.

A further object of the present invention is to design a braking system that can be used with a two wheel upright hand cart or a four wheel flat bed hand cart.

An additional object of the present invention is to provide a braking system which can be mounted on existing hand carts. The axle and wheel mountings on an existing cart can be removed and the bearing support and axle of the present invention can be mounted on the lower segment of the hand cart.

BRIEF DESCRIPTION OF THE DRAWINGS

The above, as well as other advantages of the present invention, will become readily apparent to those skilled in the art from the following detailed description of a preferred embodiment when considered in the light of the accompanying drawings.

DESCRIPTION OF THE PREFERRED EMBODIMENT

Figure 1:
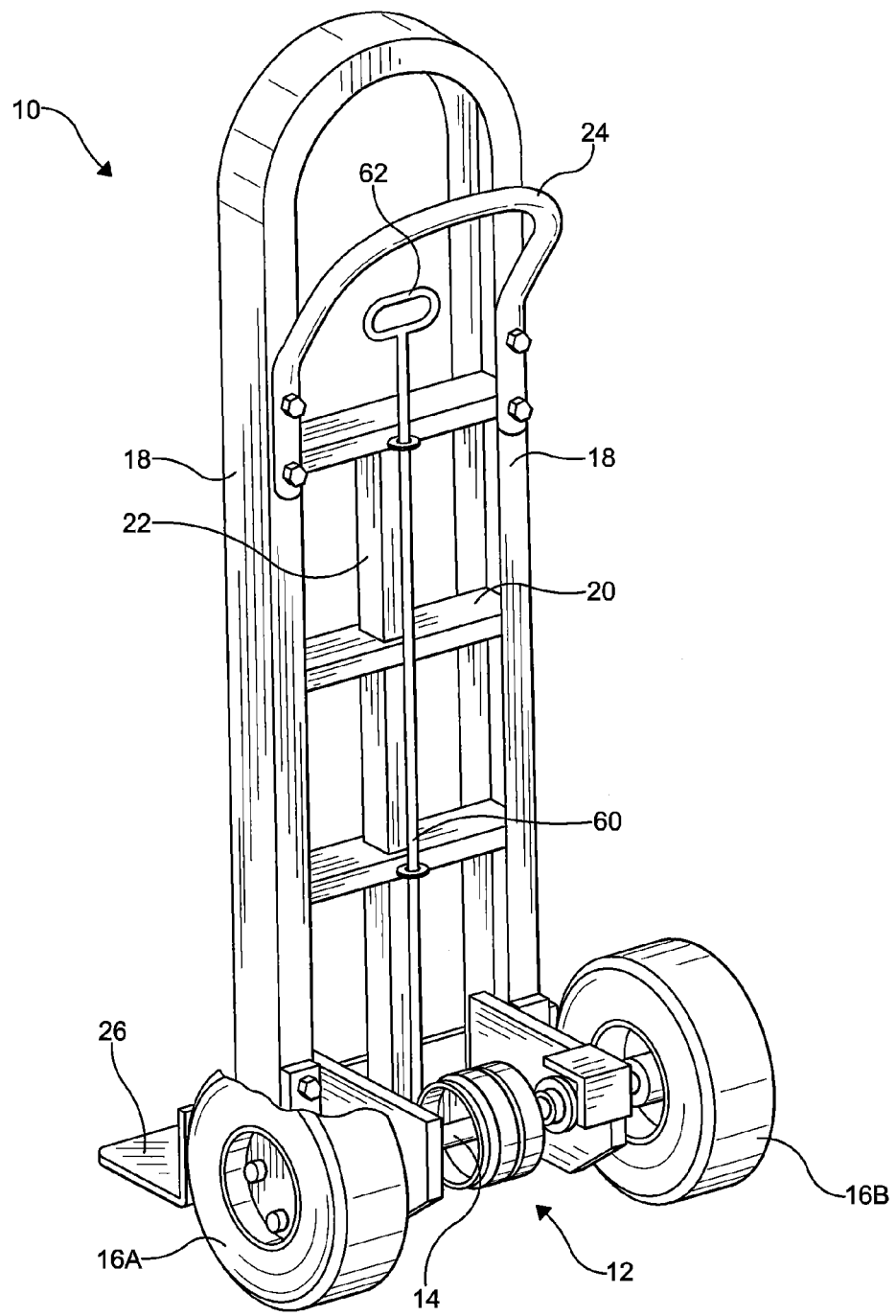
FIG. 1 shows a cart with a known braking system.

FIG. 1 shows a known hand cart with a brake system as known in the art. The braking system of the present invention is suitable for use in such a cart as is disclosed herein.

In FIG. 1, a known hand cart 10, which is suitable for use with the present invention, includes a braking system 12 mounted on the split axle 14 extending between the wheels 16a, 16b of the hand cart 10. The hand cart 10 is formed by two elongated, parallel load supporting frame members 18 with cross members 20 and center strut 22. A curved handle 24 is formed at the upper end of the frame members 18. Various handle configurations are known in the industry to facilitate operation of the hand cart 10. The frame members 18 and cross members 20 are typically made from steel or aluminum tubing or bars. An actuator bar 60 with a handle 62 is used to activate the brake system 12.

At the front, lower end of the frame members 18, a lifting blade 26 is mounted to extend perpendicularly from the frame members 18. The lifting blade 26 accomplishes the dual function of lifting and supporting objects to be moved by the hand cart and of maintaining the hand cart in an upright position when not in use.

The hand cart 10 includes a pair of laterally spaced wheels 16A, 16B mounted at the lower end of the vertical frame members 18. The wheel assembly can be connected to the cart as is standard in the art. The wheels 16A, 16B may be furnished with any type of tire. Brakes are typically furnished on hand carts used for heavier loads, and such hand carts generally include pneumatic tires.

In the prior art, the typical hand cart included support members with a single fixed axle extending through the support members. At the end of the fixed axle, bearings or other rotational devices are used in the prior art to rotatably connect the wheels to the fixed axle such that the wheels have a fixed direction and rotate independently of one another.

Figure 2:
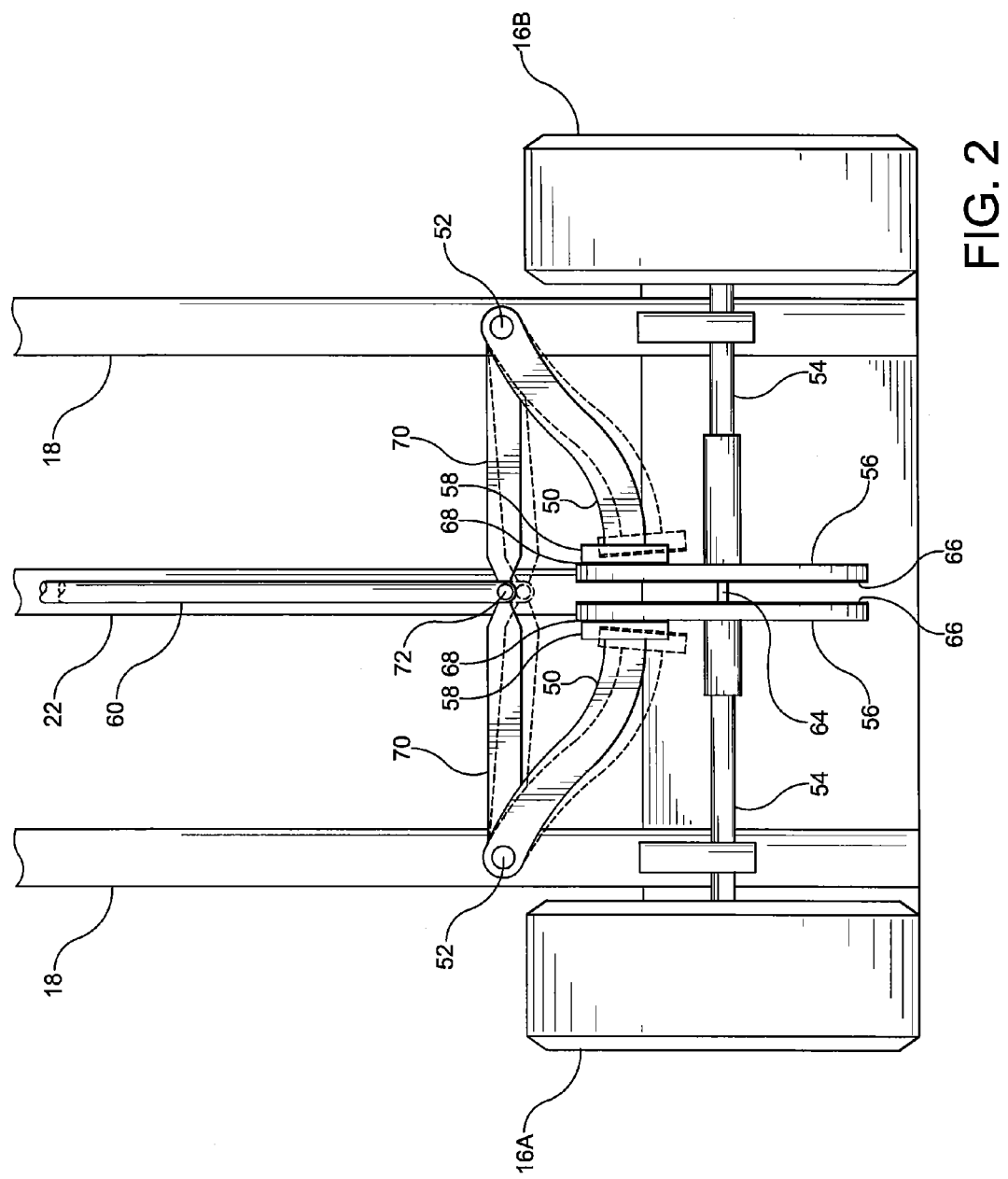
FIG. 2 shows a braking system in accordance with an embodiment of the present invention.

In an embodiment of the present invention shown in FIG. 2, two arms 50 are rotatably mounted near the lower end of the vertical frame members 18. Actuator arms 70 are slidably connected to struts 18 at pivots 52, with the arms 50 connected to the actuator arms 70. In a preferred embodiment arms 52 are fixed relative to actuator arms 70 so that when actuator arms 70 are displaced by actuator bar 60, arms 50 move inward about pivot 72 towards each other. The arms 50 extend inward towards each other.

A split axle 54 extends from the first wheel to the opposite wheel, and can be mounted by systems known in the art.

The internal ends of each part of the split axle form a portion of the braking assembly. In one embodiment each interior end is fitted with a disc brake 56 each with a brake pad 66. In another embodiment (not shown) of the present invention one of the ends is fitted with a brake pad and the other with a rotor. When pressed together, these internal ends lock the split axle 54 into a unitary single axle.

The segments of the split axle are preferably of equal diameter and would generally be cut from the same stock of steel or other acceptable material. The length of the split axle segments are sized based on the width of the hand cart and the distance between the wheels. The axle segments are typically of equal length such that the split occurs in the middle of the overall axle length, but the lengths of the segments do not have to be equal in length for the brake system to function properly.

The axle segments are designed to facilitate independent rotation of the axle segments with respect to each other and their respective affixed wheels.

The braking action may be provided by any type of mechanical, hydraulic, or electrical brake. In a preferred embodiment, a dual caliper system 58 clamps onto two brakes 56 pushing them together. Each of the brakes 56 is preferably affixed with a pad 66, so that they contact each other when the brake is applied, and each caliper 58 is preferably affixed with a pad 68, for contacting the respective exterior portion of the brake drum. A mounting rod 64 can extend through the interior of one of the axle segments 54 and align with a hole in the end of the other axle segment 54. This can help ensure proper alignment of the brake pads when they are engaged.

The operator of the hand cart will often use one hand to secure a load on the load bearing member and use the other hand to control movement of the hand cart. When operating the hand cart with one hand, the hand will usually be positioned near the center of the handle at the top of the cart. A pull handle actuator can be configured near the center of the handle so that the operator can activate the brake system by pulling on the handle with the hand on the cart. The pull handle can be of any configuration known in the art. An extended bar handle, such as the safety handles used on power lawn mowers, would provide a convenient system for one-handed operation of the hand cart and brake system. The pull handle does not have to be positioned near the center of the handle and can arranged in any position on the handle most convenient for the operator.

The braking system of the present invention could also be used on a flat bed hand cart, which has a flat, load surface supported generally parallel to the ground by four wheels/two axles. Frame members are provide which extend perpendicularly from the load surface to provide the operators with a structure to push the cart. The bearing brackets are secured to the lower face of the load surface to permit the use of the split axle and brake system on one of the axles.

The invention is not limited to the embodiments shown herein. Any braking system which can use the split axle design of the present invention can be used with embodiments of the present invention. Similarly, while a caliper system is preferred for engaging the brake, other known engagement systems would be suitable for use with embodiments of the present invention. While aluminum and steel are preferred construction material for the carts, other materials may be suitable for use with embodiments of the present invention.

The braking system of the present invention can be supplied as an original equipment item on new hand carts. In addition, the split shaft and brake system can be sold as kits for retrofitting on existing carts.

U.S. Pat. No. 5,722,515 discloses embodiments of carts and systems for connecting braking systems to carts that may be suitable for use with the present invention. U.S. Pat. No. 5,722,515 is hereby incorporated by reference as if set forth in its entirety herein.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A hand cart having a frame and a pair of laterally spaced wheels, and a brake assembly, said brake assembly comprising:
   a pair of bearing brackets connected to a hand cart in spaced-apart relationship and extending from the hand cart between a pair of laterally spaced wheels;
   each of the bearing brackets being connected to a caliper;
   a split axle rotatably mounted between the wheels and being operably connected to the cart, said split axle including a first axle segment connected to a first wheel, and a second axle segment connected to a second wheel;
   the axle segments being rotatable with respect to each other;
   each of the axle segments being connected to a corresponding one of a pair of brakes;
   an actuator mounted on the frame of the hand cart; and
   the actuator being operably connected to a pair of calipers; wherein
   each of the calipers is movable to engage a corresponding one of the brakes to move the brakes together to lock the axle for controlling or stopping the cart.

2. The hand cart defined in claim 1, wherein each brake is a drum brake.

3. The hand cart defined in claim 1, wherein each caliper has a brake pad affixed thereto, the brake pads being positioned to engage the respective brake.

4. The hand cart defined in claim 1, wherein each brake has a brake pad affixed to its inner side, so that the brake pads engage each other when the brake assembly is actuated.

5. The hand cart defined in claim 1, comprising a connecting rod, the connecting rod being mounted on one of the sides of the split axle and being configured and positioned to engage with the other side of the split axle to operably connect the spilt axle sections.

6. The hand cart defined in claim 1, wherein the actuator comprises a handle and a pull bar to actuate the braking assembly.

7. The hand cart defined in claim 1, wherein each section of the split axle is substantially identical in length.

8. An upright hand cart having a frame, a pair of laterally spaced wheels, a load plate and a brake assembly, said brake assembly comprising:
   a pair of bearing brackets connected to a hand cart in spaced-apart relationship and extending from the hand cart between a pair of laterally spaced wheels;
   each of the bearing brackets being connected to a caliper;
   a split axle rotatably mounted between the wheels and being operably connected to the cart, said split axle including a first axle segment connected to a first wheel, and a second axle segment connected to a second wheel;
   the axle segments being rotatable with respect to each other;
   each of the axle segments being connected to a corresponding one of a pair of brakes;
   an actuator mounted on the frame of the hand cart; and
   the actuator being operably connected to a pair of calipers; wherein
   each of the calipers is movable to engage a corresponding one of the brakes to move the brakes together to lock the axle for controlling or stopping the cart.

9. A hand cart having a frame, a pair of laterally spaced wheels and a lifting blade, the lifting blade comprising a flat surface and being designed to lift and support objects to be moved by the hand cart, the cart further comprising a brake assembly, said brake assembly comprising:
- a pair of bearing brackets connected to a hand cart in spaced-apart relationship and extending from the hand cart between a pair of laterally spaced wheels;
- each of the bearing brackets being connected to a caliper;
- a split axle rotatably mounted between the wheels and being operably connected to the cart, said split axle including a first axle segment connected to a first wheel, and a second axle segment connected to a second wheel;
- the axle segments being rotatable with respect to each other;
- each of the axle segments being connected to a corresponding one of a pair of brakes;
- an actuator mounted on the frame of the hand cart; and
- the actuator being operably connected to a pair of calipers; wherein
- each of the calipers is movable to engage a corresponding one of the brakes to move the brakes together to lock the axle for controlling or stopping the cart.

* * * * *